US008968584B2

(12) United States Patent
Yamamuro et al.

(10) Patent No.: US 8,968,584 B2
(45) Date of Patent: Mar. 3, 2015

(54) METHOD FOR MANUFACTURING LIQUID EJECTION HEAD

(71) Applicant: Canon Kabushiki Kaisha, Tokyo (JP)

(72) Inventors: Jun Yamamuro, Yokohama (JP); Yoshinori Tagawa, Yokohama (JP); Satoshi Ibe, Yokohama (JP); Hiroto Komiyama, Tokyo (JP); Kouji Hasegawa, Kawasaki (JP); Shiro Sujaku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/953,082

(22) Filed: Jul. 29, 2013

(65) Prior Publication Data

US 2014/0061152 A1 Mar. 6, 2014

(30) Foreign Application Priority Data

Sep. 4, 2012 (JP) ................................ 2012-194005

(51) Int. Cl.
*G01D 15/00* (2006.01)
*B41J 2/16* (2006.01)

(52) U.S. Cl.
CPC .............. *B41J 2/1626* (2013.01); *B41J 2/1603* (2013.01); *B41J 2/1623* (2013.01); *B41J 2/1628* (2013.01); *B41J 2/1629* (2013.01); *B41J 2/1634* (2013.01); *B41J 2/1639* (2013.01); *B41J 2/1645* (2013.01)
USPC .................. 216/27; 216/40; 216/41; 438/736

(58) Field of Classification Search
CPC .. B41J 2/1626; B41J 2/14008; B41J 2/14032; B41J 2/1607; B41J 2/1629
USPC ........... 216/21, 27, 40, 41, 43, 56, 87, 92, 99; 438/713, 743, 748
See application file for complete search history.

(56) References Cited

U.S. PATENT DOCUMENTS

| | | | | |
|---|---|---|---|---|
| 8,177,988 | B2 | 5/2012 | Komiyama et al. | |
| 8,613,862 | B2 * | 12/2013 | Asai et al. | 216/27 |
| 2005/0190232 | A1 * | 9/2005 | Lee et al. | 347/45 |
| 2006/0077237 | A1 * | 4/2006 | Shin et al. | 347/71 |
| 2006/0112554 | A1 * | 6/2006 | Okuno | 29/890.1 |

FOREIGN PATENT DOCUMENTS

| | | |
|---|---|---|
| JP | 2009-61665 A | 3/2009 |

* cited by examiner

*Primary Examiner* — Lan Vinh
(74) *Attorney, Agent, or Firm* — Fitzpatrick, Cella, Harper & Scinto

(57) ABSTRACT

A method for manufacturing a liquid ejection head includes the steps of: disposing an etching mask layer on a substrate having a first face and a second face that is on an opposite side of the first face, the etching mask layer being disposed on the second face; forming a concave line pattern at a region of the etching mask layer other than a region where an opening for the support port is to be formed; providing an etching opening at the etching mask layer; performing anisotropic etching from a side of the second face using the etching mask layer provided with the etching opening as a mask, thus forming the supply port at the substrate; comparing the line pattern with a recess generated at the substrate, thus selecting a device chip for liquid ejection; and connecting the selected device chip to a liquid supply part.

7 Claims, 7 Drawing Sheets

METHOD FOR MANUFACTURING LIQUID EJECTION HEAD

BACKGROUND OF THE INVENTION

1. Field of the Invention

The present invention relates to methods for manufacturing a liquid ejection head to eject liquid.

2. Description of the Related Art

Ink jet printers are well known for a recording device that performs a recording operation while ejecting liquid. Such a recording device includes a liquid ejection head, and the liquid ejection head includes: a substrate for liquid ejection head provided with an energy generating element that generates energy to eject liquid; and a flow path member making up an ejection port or a part of a flow path for the liquid. The substrate for liquid ejection head is also provided with an electrode pad that transmits an electrical signal from another member to the substrate for liquid ejection head. A base of the substrate for liquid ejection head is provided with a supply port penetrating therethrough, the supply port supplying liquid to the energy generating element.

Japanese Patent Application Laid-Open No. 2009-61665 discloses a method for forming a supply port at a substrate for liquid ejection head. Specifically, in the disclosed method, a substrate with an alkali-resistant protective film provided on its rear face is prepared, and a flow path member is formed on the substrate. Subsequently a laser pattern is formed so as to penetrate through the protective film and engrave a certain depth of a base of the substrate, and then the base is etched with alkaline liquid via the pattern.

SUMMARY OF THE INVENTION

One aspect of the present invention provides a method for manufacturing a liquid ejection head. The liquid ejection head includes: a device chip for liquid ejection including an ejection energy generating element and a supply port; and a liquid supply part that supplies liquid to the supply port. The method includes the steps of: disposing an etching mask layer on a substrate having a first face, on which the ejection energy generating element is provided, and a second face that is on an opposite side of the first face, the etching mask layer being disposed on the second face; forming a concave line pattern at a region of the etching mask layer other than a region where an opening for the supply port is to be formed; providing an etching opening at the etching mask layer; performing anisotropic etching from a side of the second face using the etching mask layer provided with the etching opening as a mask, thus forming the supply port at the substrate; comparing the line pattern with a recess generated at the substrate, thus selecting the device chip for liquid ejection; and connecting the selected device chip for liquid ejection to the liquid supply part.

Another aspect of the present invention provides a method for manufacturing a liquid ejection head. The liquid ejection head includes: a device chip for liquid ejection including an ejection energy generating element and a supply port; and a liquid supply part that supplies liquid to the supply port. The method includes the steps of: forming the supply port at a substrate by anisotropic etching, the substrate having a first face, on which the ejection energy generating element is provided, and a second face that is on an opposite side of the first face, the supply port being formed from a side of the second face; forming a concave line pattern at the second face of the substrate formed with the supply port; comparing the line pattern with a recess generated at the substrate, thus selecting the device chip for liquid ejection; and connecting the selected device chip for liquid ejection to the liquid supply part.

Further features of the present invention will become apparent from the following description of exemplary embodiments with reference to the attached drawings.

DESCRIPTION OF THE EMBODIMENTS

Figure 1:
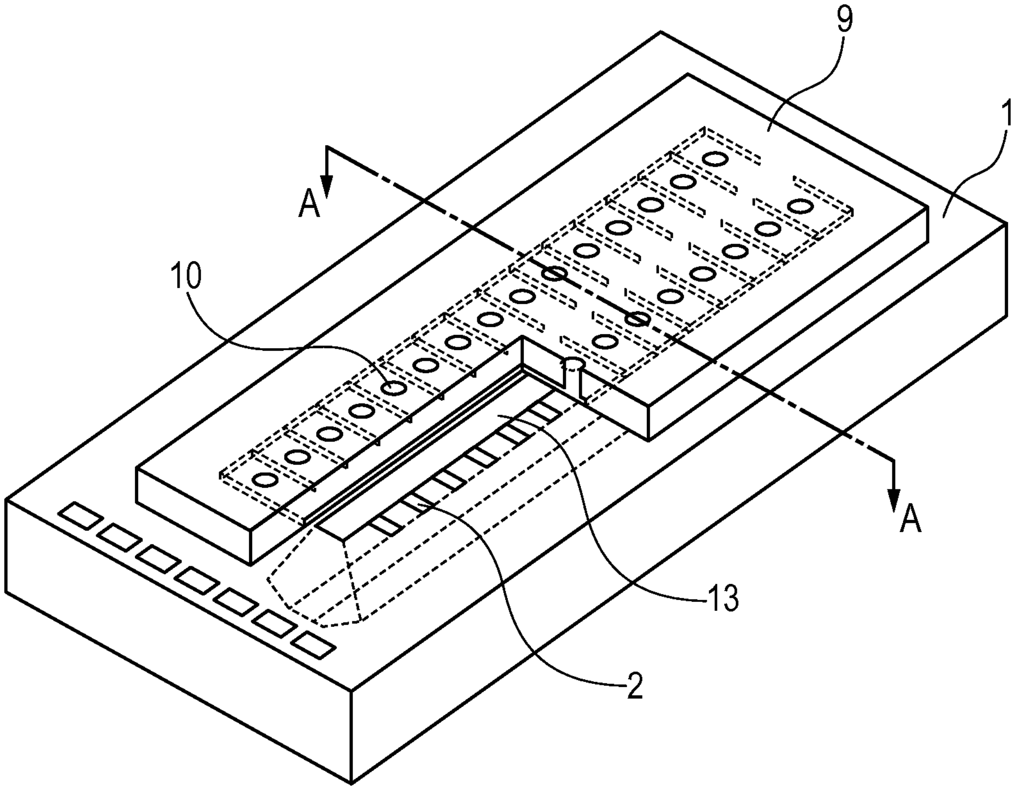
FIG. 1 is a schematic perspective view showing an exemplary configuration of a device chip for liquid ejection produced by the present embodiment.

Preferred embodiments of the present invention will now be described in detail in accordance with the accompanying drawings.

Preparation of energy generating elements and a circuit requires multiple stages of process, and without special care, scratches may occur at the rear face of the substrate due to handling of the substrate during the process. For the formation of a supply port as well, scratches (they may be called rear-face scratches) may occur at an alkali-resistant protective film during the carriage of the substrate for liquid ejection head in the process between the formation of the alkali-resistant protective film and the completion of the flow path member, which may expose the base under the alkali-resistant protective film. The supply port formed in such a state will expand the formation region of the supply port or generate a hole that is not intended originally because alkaline liquid intrudes through the scratch formed at the alkali-resistant protective film, thus etching the base, e.g., a silicon substrate. This leads to a concern that the quality of the substrate for liquid ejection head deteriorates.

As another concern, when device chips for liquid ejection formed on the same substrate and having individual ink supply ports are bonded to a head unit, if any recess of the degree affecting the quality, which results from a rear-face scratch, is present at a chip, sufficient bonding may not be achieved and so colors may mix with neighboring ink supply ports.

To avoid such a rear-face scratch, a substrate should be handled carefully during the process and an apparatus and a method may be provided so as to consider the rear face. However, such a care and a consideration for each of the multiple steps increase a cost for the apparatus and requires complicated process, and so such a measure is not practical.

In this way, the development of techniques to effectively detect a rear-face scratch affecting the quality has been desired.

It is then an object of the present invention to provide a manufacturing method of a liquid ejection head capable of easily detecting a recess due to a rear-face scratch affecting the quality and so manufacturing a liquid ejection head having excellent quality.

The following describes embodiments of the present invention, with reference to the drawings.

Herein, a liquid ejection head can be mounted on apparatuses such as a printer, a copier, a facsimile having a communication system and a word processor having a printer as well as industrial recording devices including the multifunctional combination with various processing devices. Then, such a liquid ejection head enables recording on various types of recording media such as paper, strings, fiber, cloth, leather, metal, plastic, glass, wood and ceramics.

The term “recording” in the present specification refers to not only giving an image having meaning such as letters and graphics on a recording medium but also giving an image not having meaning such as a pattern thereon.

The term “liquid” has to be broadly construed, and refers to liquid, when applying on a recording medium, enabling the formation of an image, design, a pattern or the like, processing of the recording medium, or serving to processing of ink or the recording medium. The processing of ink or a recording medium refers to, for example, improvement in fixability by solidification or insolubilization of a color material in ink applied to a recording medium, improvement in the recording quality or coloring property, or improvement in durability of an image.

The present specification describes, although not exclusively, an ink jet recording head as an exemplary application of the present invention, and the present invention may be applicable to recording heads for manufacturing of a biochip or for the usage of electronic circuit printing. Exemplary recording heads include an ink jet recording head as well as a head for color filter manufacturing or the like.

FIG. 1 is a schematic perspective view showing an exemplary configuration of a device chip for liquid ejection. The device chip for liquid ejection includes a substrate 1 such as a silicon substrate, and a flow path formation member 9 provided on the substrate 1. The substrate 1 has a first surface (this may be called a surface), on which an ejection energy generating element 2 generating energy to eject liquid such as ink is provided. The substrate 1 has a second face (this may be called a rear face) and includes a liquid supply port 13 penetrating from the first face to the second face, where the liquid supply port 13 supplies liquid such as ink to a liquid flow path provided at the flow path formation member 9. The liquid flow path communicates with a liquid ejection port 10, from which liquid droplets are ejected to a recording medium or the like.

A plurality of device chips for liquid ejection are formed on a silicon wafer. In the present specification, a plurality of device chips for liquid ejection formed on the same wafer is called a substrate for liquid ejection head.

Each device chip for liquid ejection is connected to a liquid supply part such as an ink tank, thus forming a liquid ejection head.

FIGS. 2A, 3A, 4A, 5A, 6A and 2B, 3B, 4B, 5B, 6B are schematic cross-sectional views and schematic plan views (rear-face side), respectively, to describe manufacturing process of a liquid ejection head of the present embodiment. FIGS. 2B, 3B, 4B, 5B and 6B correspond to plan views viewed from the rear-face side of the substrates in FIGS. 2A, 3A, 4A, 5A and 6A, respectively, and FIGS. 2A, 3A, 4A, 5A and 6A correspond to cross-sectional views taken along the dashed line of A-A in each of FIGS. 2B, 3B, 4B, 5B and 6B, which corresponds to the dashed line of A-A of FIG. 1.

Figure 2A:
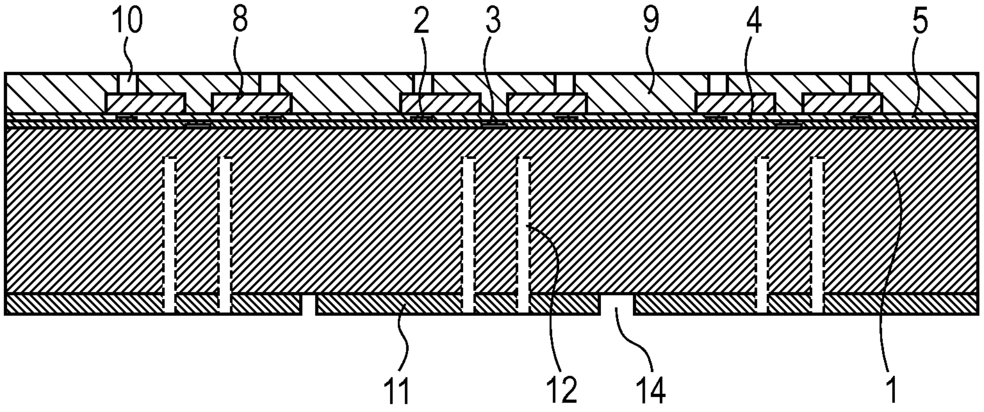
FIGS. 2A and 2B are schematic cross-sectional and plan views to describe a manufacturing method of the present embodiment.
Figure 2B:
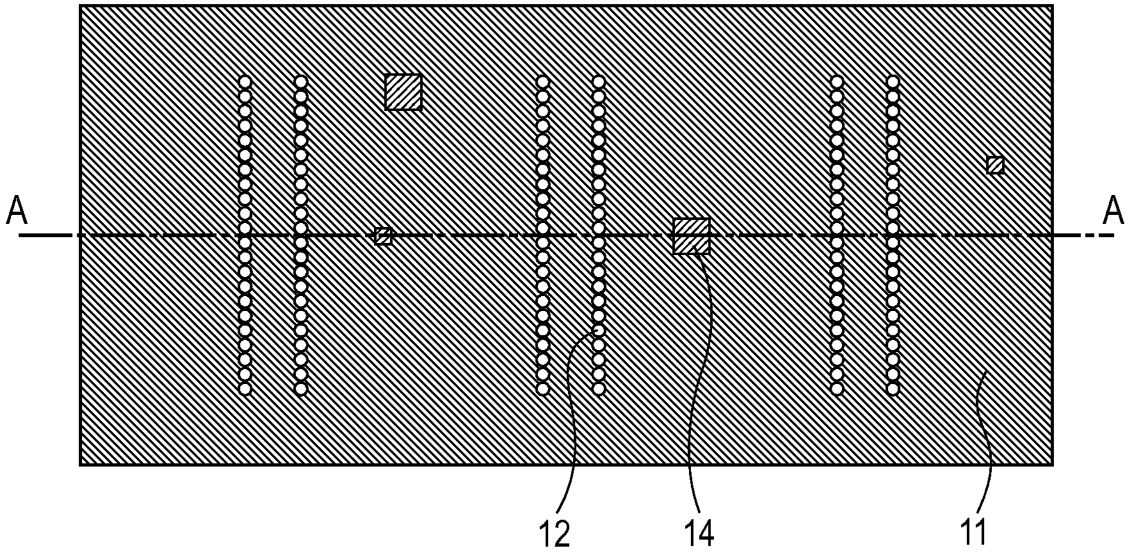

The substrate 1 such as a silicon substrate shown in FIG. 2A has crystal orientation of <100> plane, but the silicon plane orientation is not limited by this drawing.

On the surface (the first face) of the substrate 1, a thermally-oxidized film (not illustrated) and a sacrificial layer 3 made of Al or the like are formed, on which an insulation layer 4 including a silicon oxide film or the like is formed. The sacrificial layer 3 has a function to specify the formation position of a surface-side opening of an ink supply port that is formed later. On the surface side of the substrate 1, a plurality of ejection energy generating elements 2 such as heat-generating resistors are disposed. A protective film 5 including a silicon nitride film or the like to protect the ejection energy generating elements 2 and an electrical signal circuit on the substrate 1 is formed in a desired pattern by photolithography.

On the surface side of the substrate 1, a flow path pattern 8 made of soluble resin also is formed, which will be a mold member of an ink flow path. On the flow path pattern 8, a flow path formation member (this may be called a nozzle layer) 9 made of negative photosensitive resin is formed. The nozzle layer 9 is formed with ink ejection ports 10. A water-repellent layer may be provided on the nozzle layer 9 as needed.

For anisotropic etching of the silicon substrate, the surface side of the substrate including the nozzle layer 9 may be coated with an alkali-resistant protective member (not illustrated).

On the second face (rear face) of the substrate 1 that is on the opposite side of the first face, an etching mask layer 11 made of an etching mask material is formed. The surface of this etching mask layer may generate a rear-face scratch 14 due to handling of the substrate during process to form the above-mentioned circuit, flow path formation member and any others. The etching mask layer 11 is made of a material having resistance to etchant to be used during the anisotropic etching described later, and preferably is made of one or more layers. In the present embodiment, a thermally-oxidized film as an insulation film may be used as the etching mask layer 11, which may be other films such as a metal film, an inorganic film and an organic film.

The substrate 1 provided with the etching mask layer 11 is formed with leading recesses 12 formed by laser from the rear-face side to the surface side. At this time, the leading recesses 12 are formed in two lines horizontally symmetrically with reference to the center of the sacrificial layer 3, for example. The leading recess 12 may be formed using laser light that is a third harmonic wave of YAG laser (THG: wavelength 355 nm), for example. Any appropriate values may be selected for the power of laser light and its frequency.

Figure 3A:
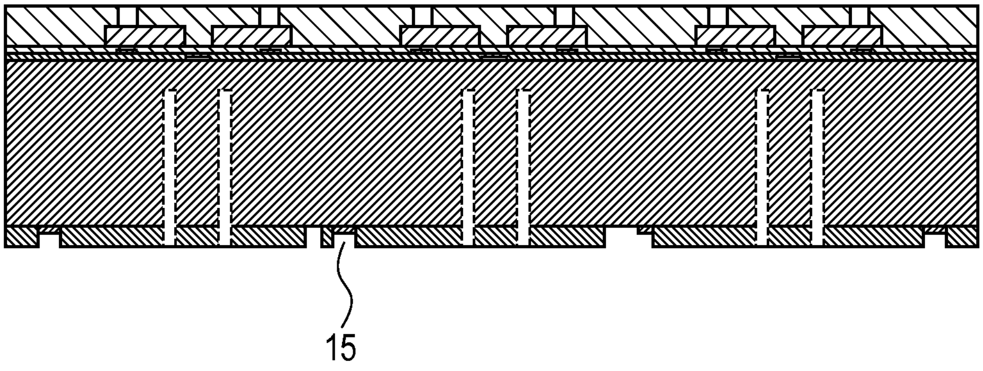
FIGS. 3A and 3B are schematic cross-sectional and plan views to describe a manufacturing method of the present embodiment.
Figure 3B:
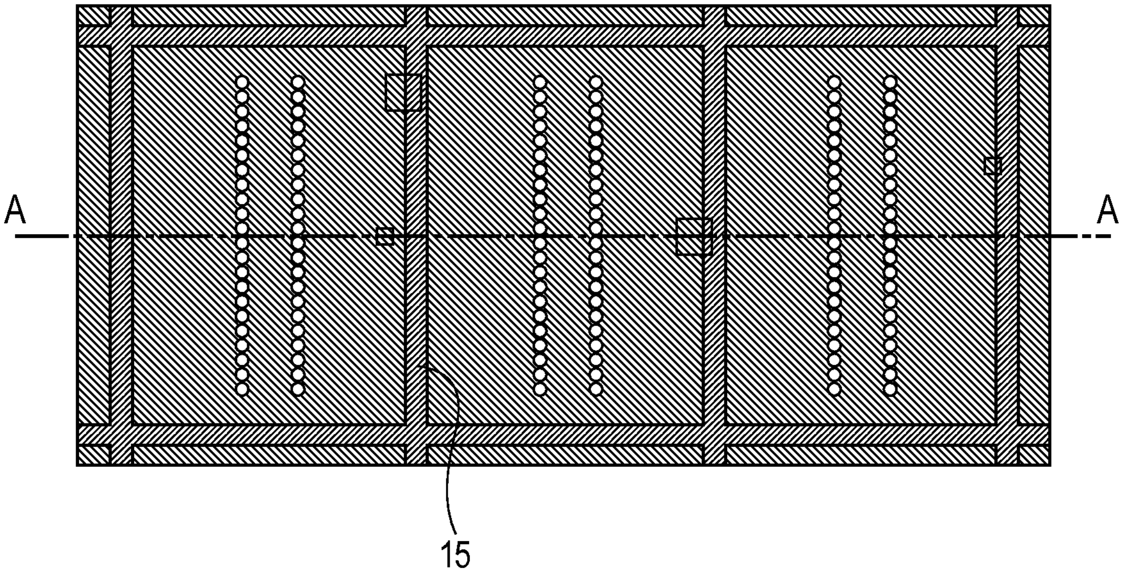

Next, as shown in FIGS. 3A and 3B, a concave line pattern 15 is formed at a region of the etching mask layer 11 on the rear-face side of the substrate 1 other than the region where an opening for a supply port is to be formed. The line pattern 15 may include a plurality of concave lines, and these lines are formed between a plurality of openings for supply ports.

The line pattern 15 may be formed by laser light, for example, and specifically laser light used may be a second harmonic wave of $YVO_4$ laser (wavelength: 532 nm). An exemplary laser irradiation device may be Osprey4.0 produced by Excel. Any appropriate values may be selected for the power of laser light and its frequency. The laser applied removes a part of the etching mask layer 11, thus forming a concave shape. In the present embodiment, the silicon substrate may be directly machined.

Such a concave shape formed by laser can improve the visibility of the line pattern 15 more. Although the line pattern 15 of the present embodiment is preferably formed by laser light that is a second harmonic wave of $YVO_4$ laser (wavelength: 532 nm), laser light is not limited to this as long as it has a wavelength enabling the formation of a concave shape.

Figure 7A:
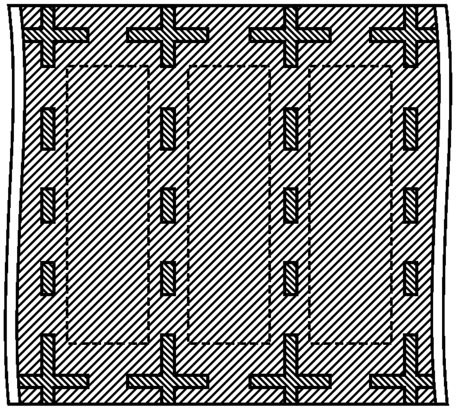
FIGS. 7A and 7B are schematic plan views to describe a manufacturing method of the present embodiment.
Figure 7B:
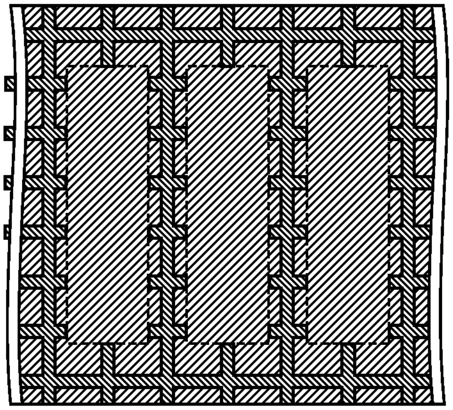

The form of the line pattern also is not limited to that shown in FIG. 3A and FIG. 3B, and the line pattern may be lines that are arranged in a grid form as shown in FIGS. 7A and 7B, for example. The ordering of the formation step of the line pattern 15 is not limited especially, and it may be performed at any stage of the process prior to the step of checking a recess due to a rear-face scratch affecting the quality. Herein, in the case of direct machining of a silicon substrate, the line pattern has to be formed after anisotropic etching.

The line pattern may be formed so as not to penetrate through the etching mask layer or so as to penetrate therethrough, and the line pattern formed so as not to penetrate through the etching mask layer is preferable.

Figure 4A:
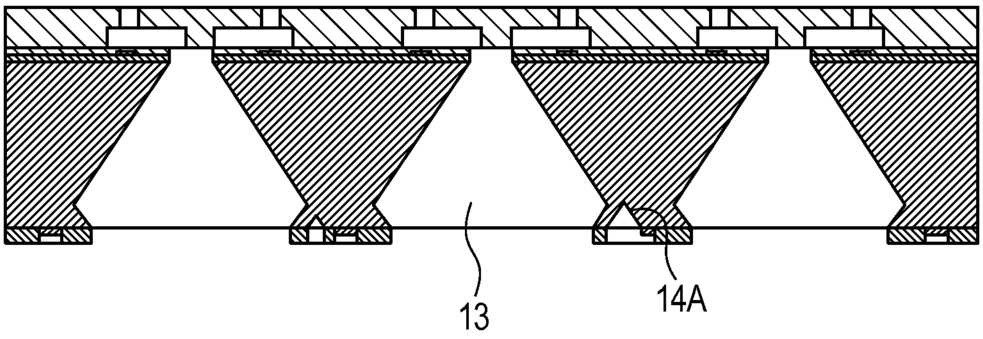
FIGS. 4A and 4B are schematic cross-sectional and plan views to describe a manufacturing method of the present embodiment.
Figure 4B:
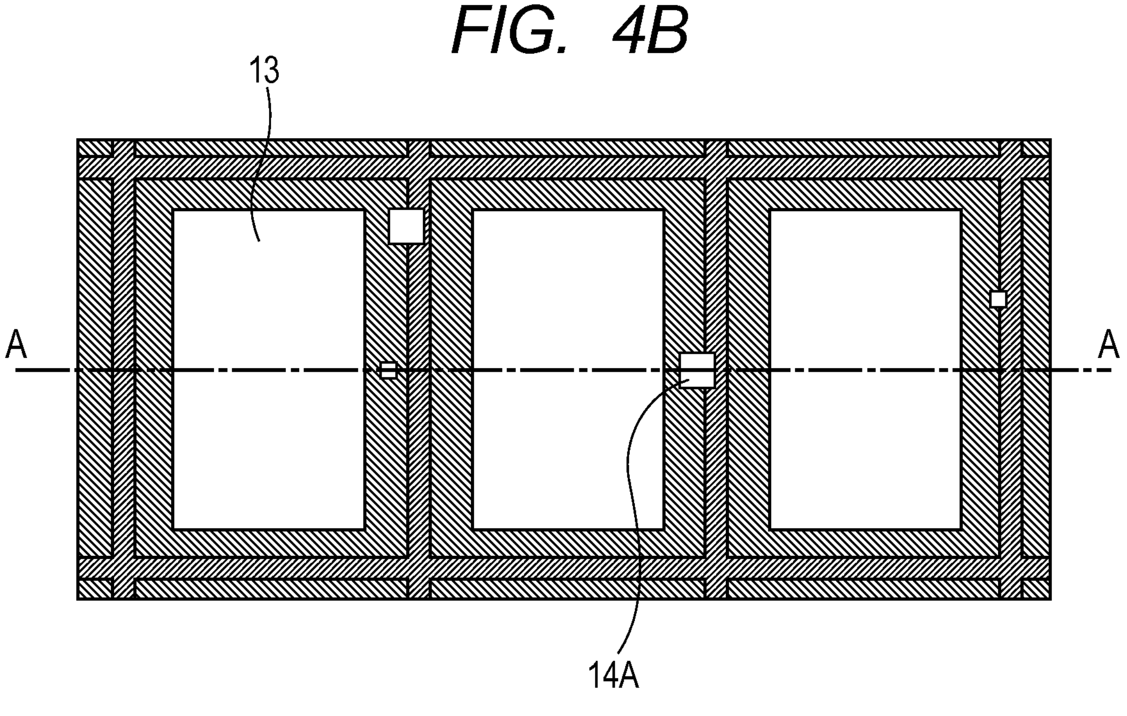

Next, as shown in FIGS. 4A and 4B, anisotropic etching is performed from the rear-face side (the second face side) of the substrate 1 using strong alkaline solution such as TMAH (tetramethylammonium hydroxide) or KOH, thus forming the ink supply ports 13. In the present embodiment, the ink supply port 13 are formed in the form of "< >" as shown in FIG. 4A.

These drawings show three ink supply ports 13, but the number of the liquid supply ports is not limited to this.

Subsequently the insulation layer 4 including a silicon oxide film or the like is removed by wet etching using hydrofluoric acid solution or the like, followed by etching of the protective film 5 including a silicon nitride film or the like by dry etching. Then, the alkali-resistant protective member (not illustrated) is removed, and the flow path pattern 8 made of soluble resin is eluted from the ink ejection ports 10 and the ink supply ports 13, thus forming an ink flow path.

Through the aforementioned process, a substrate for liquid ejection head is manufactured.

Then, the substrate for liquid ejection head is observed about rear-face scratches from the rear-face side using a metallurgical microscope or the like. Then, a recess 14A is observed via the line pattern 15. Such a recess is formed by etchant infiltrating into a rear-face scratch. Then, a recess 14A affecting the quality is detected, thus selecting a device chip for liquid ejection. In the present embodiment, the presence of the line pattern 15 facilitates the detection of a recess 14A affecting the quality. Next, a holder holding various members and a liquid supply part such as an ink tank for ink supply are connected to the thus selected device chip for liquid ejection, thus manufacturing a liquid ejection head. Alternatively, the selected good-quality device chip for liquid ejection may be connected to a heat-dissipation substrate made of alumina or a supporting member, which may be then connected to the liquid supply part.

Figure 8:
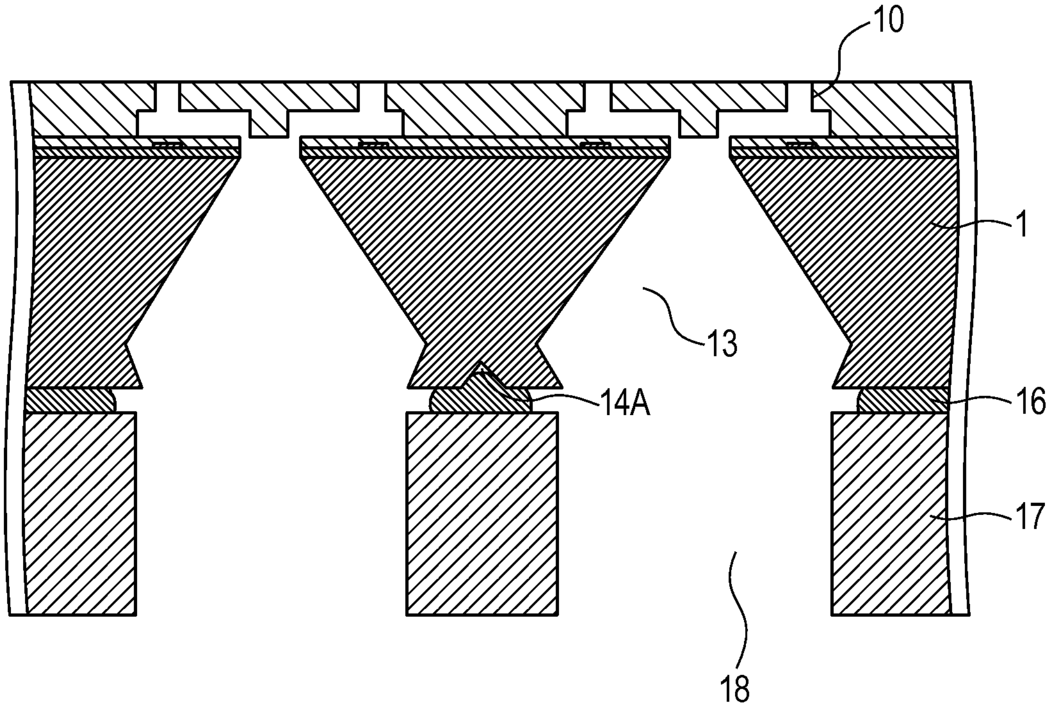
FIG. 8 is a schematic cross-sectional view showing an exemplary configuration of a liquid ejection head produced by the present embodiment.

FIG. 8 schematically shows a cross-section of a liquid ejection head. As shown in FIG. 8, the liquid ejection head can be configured so that a device chip for liquid ejection is bonded to a supporting member 17 via adhesive 16 while letting each liquid supply port 13 communicate with a liquid flow path 18. The supporting member 17 is then connected to the liquid supply part.

As shown in FIG. 8, the liquid ejection head produced by the present embodiment is free from recesses affecting the quality, and so enables favorable printing without problems of color mixture.

In another embodiment, a line pattern may be directly formed on the substrate 1. That is, in the present embodiment, following the removal of the etching mask layer, a line pattern may be directly formed on the substrate, and comparison may be made between the line pattern and a recess.

The line pattern preferably is formed concurrently with the provision of an etching opening at the etching mask layer to form an etching initiation surface. That is, the line pattern and the etching opening preferably are formed simultaneously.

Example 1

The following describes examples of the present invention, with reference to the drawings. The present invention is not limited to the following examples.

As shown in FIG. 2A, a silicon substrate 1 having crystal orientation of <100> plane was prepared. On this silicon substrate 1, a thermally-oxidized film (not illustrated) and an Al layer 3 as a sacrificial layer were formed, on which a silicon oxide film 4 was formed as an insulation layer. On this film, heat-generating resistors were formed, thus disposing a plurality of ejection energy generating elements 2.

Next, a silicon nitride film 5 was formed as a protective film for the ejection energy generating elements 2 and an electrical signal circuit on the silicon substrate 1, and was then formed into a desired pattern by photolithography. Next, on the silicon substrate 1 including the ejection energy generating elements 2, a flow path pattern 8 was formed using soluble resin. The soluble resin layer 8 was applied by spin coating or the like, followed by exposure with UV rays/Deep UV rays or the like and development, thus forming a pattern. The soluble resin in the present embodiment used was polymethyl isopropenyl ketone (ODUR: produced by Tokyo Ohka Kogyo Co., Ltd.), and the flow path pattern 8 had a film thickness of about 15 μm. Next, on the flow path pattern 8, negative photosensitive resin was disposed by spin coating, followed by exposure and development, thus forming a nozzle layer 9. Then on the nozzle layer 9, a water-repellent layer (not illustrated) was formed. At the nozzle layer 9, an ink ejection port 10 was formed by the exposure and development with i-line. The negative photosensitive resin in the present embodiment had a film thickness of about 20 μm. Next, for protection during anisotropic etching of silicon, the surface of the nozzle layer 9 was coated with an alkali-resistance protective member (not illustrated). As an etching mask layer 11, a silicon thermally-oxidized film was used.

Next, leading recesses 12 were formed by laser from the rear-face side to the surface side of the silicon substrate 1. At this time, the leading recesses 12 were formed in two lines horizontally symmetrically with reference to the center of the sacrificial layer 3. The leading recess 12 was formed by laser light that was a third harmonic wave of YAG laser (THG: wavelength 355 nm), where appropriate values were set for the power of laser light and its frequency.

Figure 5A:
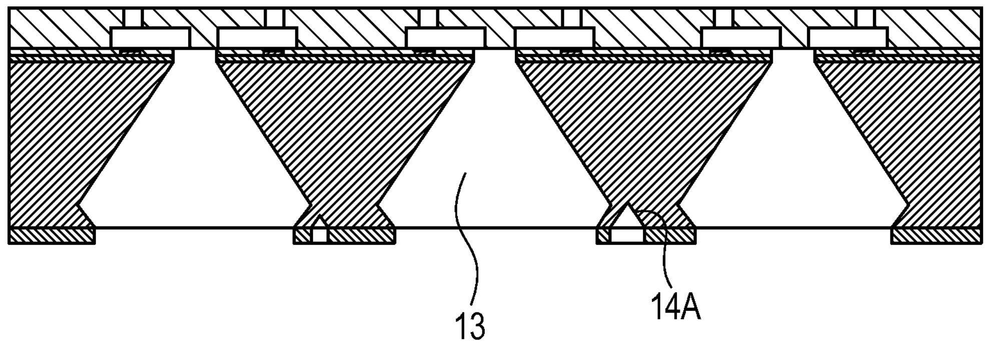
FIGS. 5A and 5B are schematic cross-sectional and plan views to describe a manufacturing method of the present embodiment.
Figure 5B:
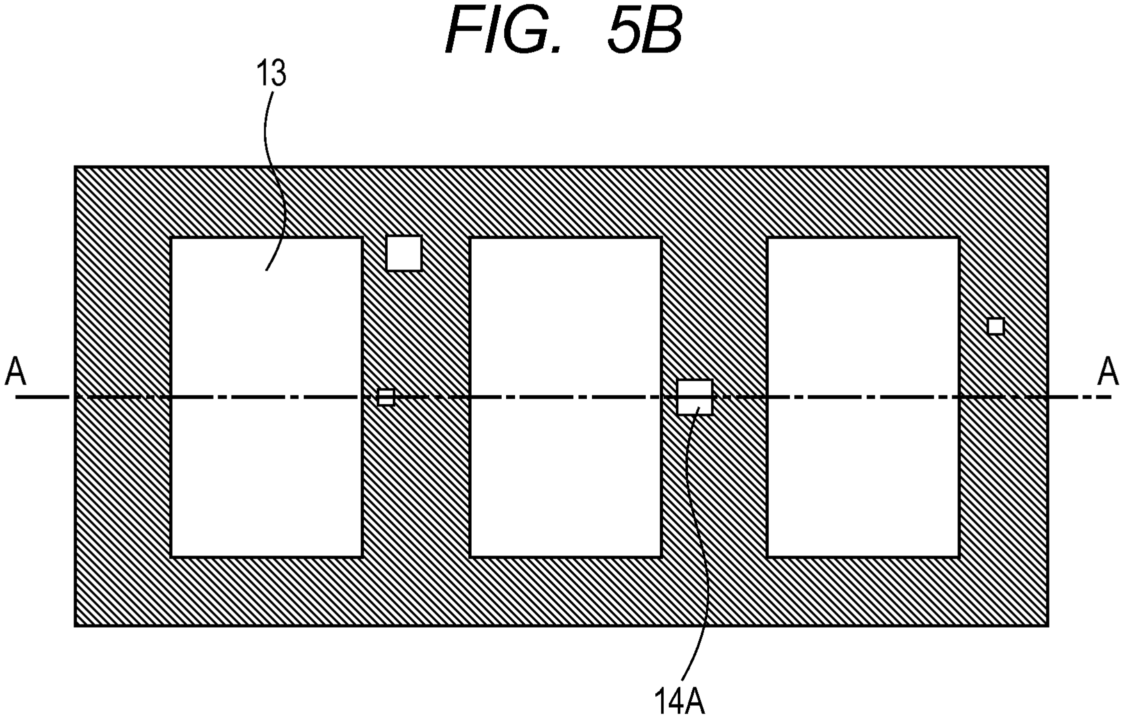

Next, crystal anisotropic etching was performed from the rear-face side of the silicon substrate 1 using strong alkaline solution such as TMAH or KOH as anisotropic etchant, thus forming ink supply ports 13 in the form of "< >" as shown in FIGS. 5A and 5B. Subsequently, the silicon oxide film 4 and the etching mask layer 11 on the rear-face side of the silicon substrate 1 were removed by wet etching using hydrofluoric acid solution.

During such process, a rear-face scratch 14 may occur at the etching mask layer 11 on the silicon substrate 1 due to handling of the substrate, thus exposing the base made of the silicon substrate 1. If anisotropic etching is performed in this state, alkaline liquid may intrude through the rear-face scratch 14, and thus the base made of the silicon substrate may be etched and a recess that is not originally intended may occur.

Figure 6A:
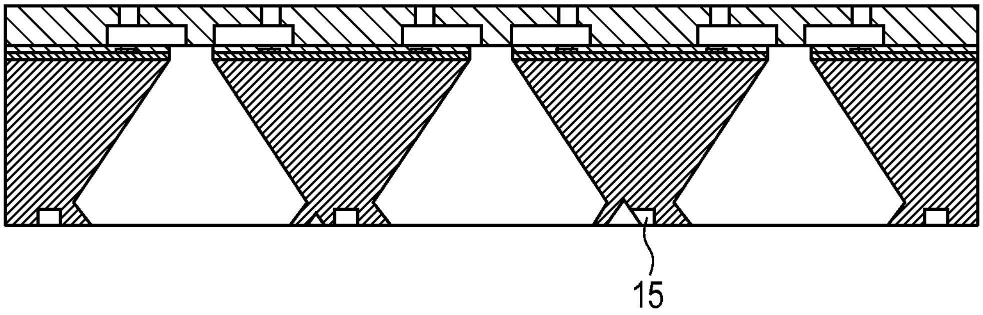
FIGS. 6A and 6B are schematic cross-sectional and plan views to describe a manufacturing method of the present embodiment.
Figure 6B:
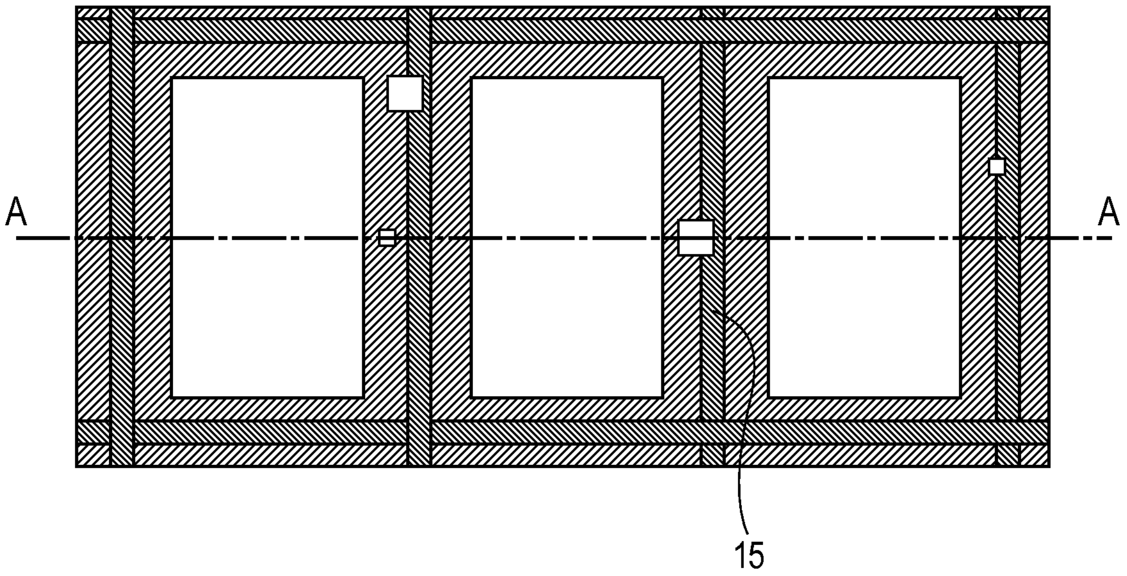

Next, as shown in FIGS. 6A and 6B, a line pattern as a line having a predetermined width was directly formed at the silicon substrate 1. The line pattern 15 was formed using laser light that was a second harmonic wave of $YVO_4$ laser (wavelength: 532 nm) of Osprey 4.0 produced by Excel. Appropriate values were set for the power of laser light and its frequency, thus machining the rear-face side of the silicon substrate 1 in a convexo-concave form. Such a convexo-concave form further improved the visibility of the pattern.

Next, the silicon nitride film 5 was etched by dry etching. Further the alkali-resistant protective film (not illustrated) was removed, and then the flow path pattern 8 was eluted from the ink ejection ports 10 and the ink supply ports 13, thus forming an ink flow path. Through such process, a substrate for liquid ejection head was manufactured.

Subsequently, the silicon substrate 1 was observed from the rear-face side using a metallurgical microscope or the like for detection, via the line pattern 15, of a recess 14A having a predetermined width or more affecting the quality, thus selecting good-quality device chips for liquid ejection only. The presence of the line pattern 15 facilitated the detection of a recess 14A affecting the quality due to a rear-face scratch 14. For the selection of good-quality items, standards or specifications may be provided beforehand for the shape of a recess affecting the quality.

Then, the thus selected good-quality device chip for liquid ejection was bonded to a heat-dissipation substrate. Next, a holder holding various members and an ink tank for ink supply were connected, thus manufacturing a liquid ejection head.

Printing was performed using the thus obtained liquid ejection head. As a result, there were no recesses affecting the quality and so favorable printing was enabled without problems of color mixture.

Example 2

The steps were the same as those in Example 1 until the leading recess 12 was provided. The present embodiment used, as the etching mask layer 11, a thermally-oxidized film having resistance to anisotropic etchant.

Next, as shown in FIGS. 3A and 3B, a line pattern 15 as a line having a predetermined width was formed at an etching mask layer 11 on the rear-face side of the silicon substrate 1. The line pattern 15 was formed using laser light that was a second harmonic wave of $YVO_4$ laser (wavelength: 532 nm) of Osprey4.0 produced by Excel. Appropriate values were set for the power of laser light and its frequency, thus forming a concave shape at the etching mask layer as shown in FIGS. 3A and 3B.

The present embodiment is preferable because it can remove cuttings generated by the laser machining during the anisotropic etching performed later.

Next, crystal anisotropic etching was performed from the rear-face side of the silicon substrate 1 using strong alkaline solution such as TMAH or KOH as anisotropic etchant, thus forming ink supply ports 13 in the form of "< >" as shown in FIGS. 4A and 4B.

Subsequently, the silicon oxide film 4 was removed by wet etching using hydrofluoric acid solution. At this time, the etching mask layer 11 on the rear-face side of the silicon substrate 1 also was etched partially due to a rear-face scratch there. Next, the silicon nitride film 5 was etched for removal by dry etching. Further the alkali-resistant protective film (not illustrated) was removed, and then a flow path pattern 8 was eluted from the ink ejection ports 10 and the ink supply ports 13, thus forming an ink flow path.

Through such process, a substrate for liquid ejection head was manufactured.

Subsequently, the silicon substrate 1 was observed from the rear-face side using a metallurgical microscope or the like for detection, via the line pattern 15, of a recess 14A affecting the quality, thus selecting good-quality device chips for liquid ejection. The presence of the line pattern 15 facilitated the detection of a recess affecting the quality.

Then, the thus selected good-quality device chip for liquid ejection was bonded to a heat-dissipation substrate. Next, a holder holding various members and an ink tank for ink supply were connected, thus manufacturing a liquid ejection head.

Printing was performed using the thus obtained liquid ejection head. As a result, there were no recesses affecting the quality and so favorable printing was enabled without problems of color mixture.

According to the present invention, a recess affecting the quality due to a rear-face scratch can be easily detected, and so a liquid ejection head having excellent quality can be manufactured. According to the manufacturing method of the present invention, since a line pattern is formed on the rear face of the substrate, a recess affecting the quality due to a rear-face scratch can be easily detected via the line pattern, and so a reliable liquid ejection head can be manufactured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-194005, filed Sep. 4, 2012, which is hereby incorporated by reference herein in its entirety.

What is claimed is:

1. A method for manufacturing a liquid ejection head including: a device chip for liquid ejection including an ejection energy generating element and a supply port; and a liquid supply part that supplies liquid to the supply port, the method comprising the steps of:

disposing an etching mask layer on a substrate having a first face, on which the ejection energy generating element is provided, and a second face that is on an opposite side of the first face, the etching mask layer being disposed on the second face;

forming a concave line pattern at a region of the etching mask layer other than a region where an opening for the supply port is to be formed;

providing an etching opening at the etching mask layer;

performing anisotropic etching from a side of the second face using the etching mask layer provided with the etching opening as a mask, thus forming the supply port at the substrate;

comparing the line pattern with a recess generated at the substrate, thus selecting the device chip for liquid ejection; and connecting the selected device chip for liquid ejection to the liquid supply part.

2. The method for manufacturing a liquid ejection head according to claim 1, wherein the line pattern and the etching opening are formed simultaneously.

3. The method for manufacturing a liquid ejection head according to claim 1, wherein the line pattern is formed so as not to penetrate through the etching mask layer.

4. The method for manufacturing a liquid ejection head according to claim 1, wherein the etching mask layer is a thermally-oxidized film.

5. A method for manufacturing a liquid ejection head including: a device chip for liquid ejection including an ejection energy generating element and a supply port; and a liquid supply part that supplies liquid to the supply port, the method comprising the steps of:

forming the supply port at a substrate by anisotropic etching, the substrate having a first face, on which the ejection energy generating element is provided, and a second face that is on an opposite side of the first face, the supply port being formed from a side of the second face;

forming a concave line pattern at the second face of the substrate formed with the supply port;

comparing the line pattern with a recess generated at the substrate, thus selecting the device chip for liquid ejection; and connecting the selected device chip for liquid ejection to the liquid supply part.

6. The method for manufacturing a liquid ejection head according to claim 1, wherein the line pattern is formed using laser.

7. The method for manufacturing a liquid ejection head according to claim 6, wherein the laser is a second harmonic wave of $YVO_4$ laser having a wavelength of 532 nm.

* * * * *